Patented Feb. 22, 1927.

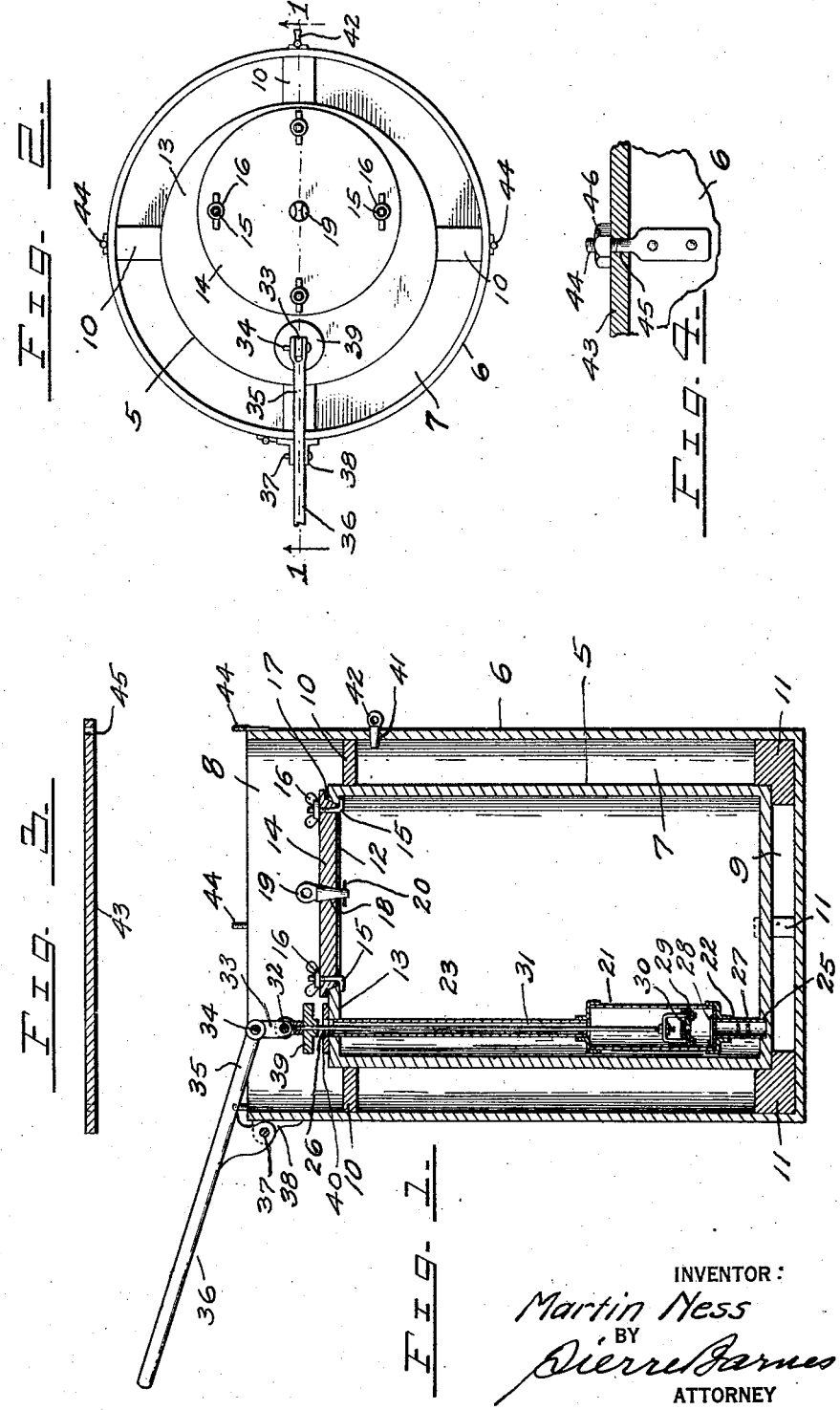

1,618,548

UNITED STATES PATENT OFFICE.

MARTIN NESS, OF LATOUCHE, TERRITORY OF ALASKA.

RECEPTACLE.

Application filed November 6, 1924. Serial No. 748,051.

This invention relates to receptacles for the storage and transportation of perishable articles such as fish.

The object of the invention is the provision of a receptacle of this character which will be of inexpensive and durable construction, and which will be efficient in use.

A further object is the provision of means provided in the storage compartment for extracting air therefrom to afford a vacuum, or nearly so, in which the food may be retained in good condition for a long time.

Other objects and advantages of the invention will appear in the following specification.

The invention consists in the novel construction, adaptation and combination of parts hereinafter described and claimed.

In the accompanying drawing,—

Figure 1 is a transverse vertical section on line 1—1 of Fig. 2 showing an embodiment of my invention, the cover of the outer vessel being omitted. Fig. 2 is a plan view of Fig. 1. Fig. 3 is a transverse vertical section of the cover of the outer vessel. Fig. 4 is an enlarged fragmentary detail view partly in elevation and partly in section of a preferred fastening means for the cover shown in Fig. 3.

The invention comprises an inner vessel 5 and an outer vessel 6 of such relative sizes as will afford an annular space 7 surrounding the inner vessel and communicating spaces 8 and 9, respectively, above and below the inner vessel. Said vessels are rigidly held in such spaced relation by suitable means, which means are herein shown as blocks 10 and 11 interposed between the two vessels. Said vessels are water tight. The inner vessel 5 is provided with an opening 12 in its top wall 13 for the insertion and removal of articles.

For said opening there is provided a closure 14 which is removably held in place by suitable fastening means such, for example, as hook screws 15 and clamping nuts 16.

A gasket 17 may advantageously be used to provide a non-leakable joint between the vessel and its closure 14.

For admitting air into the vessel 5 to facilitate the removal of the closure 14 there is provided a vent hole 18, illustrated in said closure, and for which hole is provided a tapering plug valve 19, which desirably is prevented from being removed from said hole as by means of a key or pin 20 extending through the plug and engageable with the bottom surface of the closure 14.

Included in the invention is a pump for exhausting air from the interior of vessel 5. As shown said pump consists of a pump barrel 21 located within the vessel and rigid with an inlet pipe 22 and an outlet pipe 23 which are advantageously secured to the bottom 24 and top wall 13 by being socketed in a recess 25 of the former and a port 26 in the top. The inlet pipe 22 is apertured as at 27 for the admission of air.

Provided in the lower end of the pump barrel is a non-return valve 28. Operating in said barrel is a pump plunger 29 having a passage way for which is provided a non-return valve 30. The pump plunger is connected to the lower end of a rod 31 which extends through the outlet pipe 23 and has its upper end above the vessel 5 connected by a pivot pin 32 to an end of a link 33. The other end of this link is connected by means of a pin 34 with the arm 35 of an operating lever handle 36 which is fulcrumed by means of a pin 37 to a bracket 38 attached to the outer vessel 6.

The pins 34 and 37 are removable to permit the handle 36 being disconnected when unemployed.

Secured to the rod 31 is a disk 39 which is adapted to be brought against a seat 40 and acts as a valve to close the port 26.

At a short distance below the plane of the top of the vessel 5, the outer vessel 6 is provided with a hole 41 through which water may be withdrawn prior to removing the closure 14 from its connection with vessel 5.

A valve or stopper 42 is provided for the hole 41 for use when it is desired to wholly submerge the vessel 5.

The upper end of the vessel 6 is open and to close the same, subsequent to the removal of the pump handle, I provide a cover 43 (Fig. 3) which may be retained upon said vessel by suitable fastening means as, for example, screw threaded studs 44 secured to the vessel to extend through cover holes such as 45 to receive clamping nuts such as 46 engaging against the cover.

For use food or other articles are inserted into vessel 5 through the opening 12, the closure 14 therefor is placed over the same and secured by the fastening devices 15, 16.

The pump is then operated by means of the handle 36 to exhaust air from the interior of vessel 5 and when this is accomplished the pump rod 31 is pushed down to cause the valve 39 to be brought against its seat 40. The pins 34 and 37 are disengaged from the handle 36 for the removal of the same from its connections with the pump rod and the vessel 6.

Water is then supplied into the vessel 6 to fill the spaces 7, 8 and 9 to effect a water seal about the inner vessel. The cover 43 is finally placed upon the top of the outer vessel 6 and secured thereto by the fastening devices 44 and 46.

For removing articles from the vessel 6 the cover 43 is removed and the plug 42 is withdrawn to permit the outflow of water from such vessel to expose the upper end of the vessel 5.

The plug 19 is withdrawn sufficiently to admit air into the vessel 5, and the closure 14 removed from the opening 12 through which the contents of the vessel 5 are accessible.

While I have described specifically the preferred embodiment of the invention, I do not confine myself thereto except as limited by the appended claims.

What I claim, is,—

1. A food storage receptacle comprising, in combination, two vessels held in spaced relation one within the other to afford a water containing space surrounding the inner vessel, said vessels being each provided with an opening in its top, detachable covers for the respective openings, a pump located within the inner vessel for withdrawing air from the latter, an air discharge pipe for the pump, the outlet of said pipe opening into the space enclosed by the outer vessel and above the inner vessel, a rod for operating the pump plunger, a means for actuating the pump plunger, and means mounted upon said rod for effecting the closing of the pipe outlet.

2. A food storage receptacle comprising, in combination, two vessels held in spaced relation one within the other to afford a water containing space surrounding the inner vessel, said vessels being each provided with an opening in its top, detachable covers for said openings, a valved air inlet opening for the inner of said vessels, a plunger pump provided within the inner vessel for withdrawing air therefrom, an air discharge pipe for the pump, said pipe terminating in a port provided in the top end of the inner vessel, a rod for operating the pump plunger, said rod extending through said pipe, and a means detachably connected within the space enclosed by the outer vessel to said rod for actuating the pump plunger.

Signed at Latouche, Alaska, this 5th day of October, 1924.

MARTIN NESS.